Patented Jan. 2, 1923.

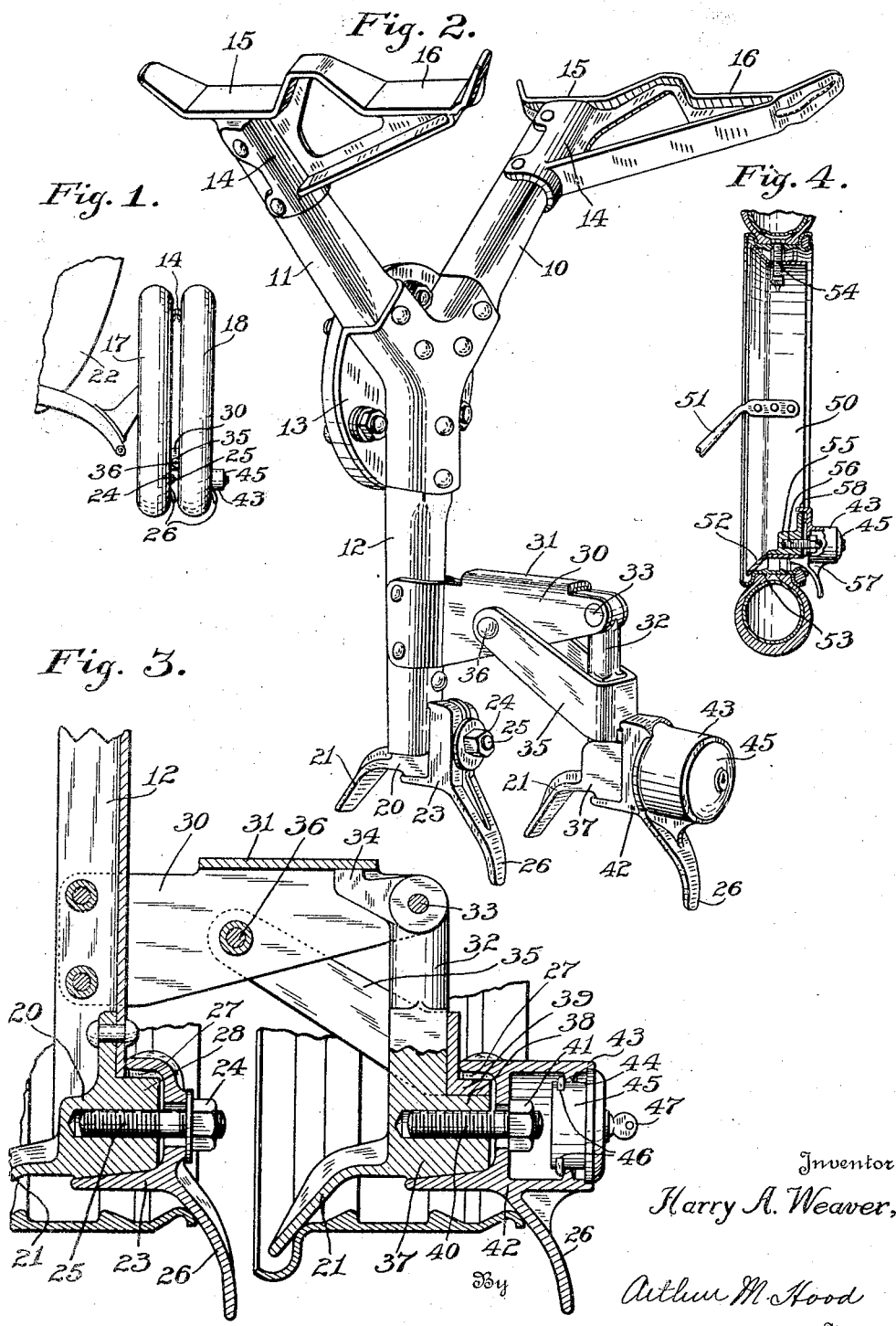

1,441,050

UNITED STATES PATENT OFFICE.

HARRY A. WEAVER, OF INDIANAPOLIS, INDIANA, ASSIGNOR TO THE OAKES COMPANY, OF INDIANAPOLIS, INDIANA, A CORPORATION OF INDIANA.

TIRE CARRIER.

Application filed December 8, 1921. Serial No. 520,901.

*To all whom it may concern:*

Be it known that I, HARRY A. WEAVER, a citizen of the United States, residing at Indianapolis, in the county of Marion and State of Indiana, have invented a new and useful Tire Carrier, of which the following is a specification.

It is the object of my invention to provide a tire-carrier lock for spare tires, suitable for locking in place either one or two spare tires, and to minimize the possibility of their removal by an unauthorized person, while permitting their ready removal by an authorized person.

The accompanying drawing illustrates my invention: Fig. 1 is a side elevation of a two-tire carrier, embodying my invention, with two tires in place thereon, showing also a fragment of the rear of the automobile to which said tire carrier is applied; Fig. 2 is a perspective view of a tire carrier embodying my invention and adapted to carry two tires; Fig. 3 is a fragmentary vertical section through the lower part of the tire carrier of Fig. 2; and Fig. 4 is a vertical section, on a somewhat smaller scale, through a ring-type tire carrier embodying some features of my invention.

The tire carrier shown in Figs. 1, 2, and 3 has three radiating arms 10, 11, and 12 carried on a central plate 13. At the outer ends of each of arms 10 and 11 there is a fitting 14, which projects rearward out of the plane of the arms 10, 11, and 12 and is provided with two notches 15 and 16 for receiving two demountable rims and tires 17 and 18. The fittings 14 are rigid fittings, without movable parts.

At the lower end of the arm 12 there is fixed a fitting 20 provided with a finger or prong 21 for bearing against that side of the demountable rim which is toward the body of the vehicle 22. A removable member 23 is removably fastened to the member 20 by a nut 24, both such member and such nut fitting on a stud bolt 25 carried by such fitting 20. The member 23 has a prong 26 for bearing against that side of the demountable rim which is away from the vehicle body 22. The prong 26 is preferably longer than the prong 21, to prevent prying of the rim over it. The member 23 is provided with a pocket 27 on its side toward the member 20, which pocket 27 fits over a projection 28 from such fitting. The projection 28 and the pocket 27 are both angular in shape, conveniently approximately rectangular, so that one cannot be turned upon the other when they are together.

The arm 12 has fixed to it near its lower end a rearward arm 30, which projects away from the vehicle body 22. This arm 30 is conveniently of U-shaped cross section, so that at the top it has a closing portion 31. A swinging arm 32 is pivoted at the outer end of the rearward arm 30, on the pivot pin 33, and is located between the sides of the U-shaped side arm. The swinging arm 32 may be swung outward and upward, but when swung downward is limited against swinging past the vertical position by a foot 34 which bears against the under face of the closing portion 31 of such arm 30. A U-shaped tension brace 35 is pivoted to the rearward arm 30 on a pivot pin 36 closer to the arm 12 than is the pivot 33, and at its free ends overlies the swinging arm 32, so that it must be swung up out of the way before the swinging arm 32 can be swung outward and upward. The swinging arm 32 at its free end is provided with an enlargement 37 in general like the fitting 20, and provided with a similar finger 21 and with a lateral extension 38 quite like the projection 28 of the fitting 20; but the extension 38 is of slightly less vertical length than is the projection 28, and the free end of the tension brace 35 rests on the extension 38 and is itself provided with an extension 39 which cooperates with the extension 38 to form a whole of substantially the same size as the projection 28. The portion 37 carries a stud bolt 40 like the stud bolt 25, and provided with a nut 41 similar to the nut 24. A lock member 42 is provided which is similar to the member 23 in having a pocket 27 and a long prong 26. In addition, it has an outwardly projecting circular box-like flange 43, which near its outer edge is provided with an inner circumferential flange 44. A lock disk 45 may be inserted into the open end of the box 43, for closing such end; and this disk 43 is provided with retractible fingers 46 which latch behind the flange 44 but are removable by a suitable key 47 working in a suitable lock with which said lock disk 45 is provided. When the lock disk 45 is in place, it and the flange 43 completely enclose the nut 41, so that such nut 41 cannot be removed, and in consequence the tire between the prongs 41 and 26 cannot be removed. If there are two tires, arranged as shown in Fig. 1, the members 23 and 42 are arranged in the positions shown; but if there is only a single tire, the parts 23 and 42 may be interchanged, so that the member 42 with its locking features may be mounted on the stud bolt 25 of the member 20 to lock such single tire in place. In either case, the projection of the extension 28 or of the extensions 38 and 39 into the pocket 27 of the member 42 effectively prevents the prying off of such member by a crow bar, as it is substantially impossible for a crow bar to be inserted far enough beneath the edge walls of the pocket 27 on any side to get a sufficient bite.

In the arrangement shown in Fig. 4, which is a carrier for a single tire, a ring 50 is mounted on a suitable support 51, and is provided with an out-turned flange 52 on its side toward the vehicle for bearing against the corresponding side of a demountable rim 53. The valve stem 54 of the associated tire axis passes through a hole in the top of the ring 50. At the bottom of the ring 50 there is a fitting 55 provided with a stud bolt 56 like the stud bolts 25 and 40 shown in Fig. 3, on which may be mounted a lock member 57 in general like the member 42 already described. The member 57 has a flange 58 at its upper part for projecting over the upper end of the fitting 55 to prevent the application of a crow bar, and has the same box-like flange 43 and removable lock disk 45 as is shown in Fig. 3. The arrangement shown in Fig. 4 does not have the double-tire feature, but only the feature of preventing the insertion of a crow bar for prying off the lock member 57.

I claim as my invention:

1. In a tire carrier, the combination of carrying means for holding a demountable rim, a removable member provided with a portion projecting outward along the side of such rim, said carrying means being provided with a projection and said removable member with a pocket which fits over and completely encloses said projection, said removable member being provided wtih a second pocket, means extending from said projection on said carrying means through an opening into said second pocket for fastening said removable part to said carrying means, said fastening means being accessible through an opening into said second pocket, and a removable locking member for closing the opening into said second pocket.

2. In a tire carrier, the combination of means for supporting a demountable rim, a member removably mounted on said supporting means and having a portion which projects outward at the edge of such rim, said removable member being provided with a pocket, a removable locking member for closing said pocket, means located in said pocket and accessible only when said locking means is removed for locking said removable member to said carrying means, said carrying means and said removable member having the one a recess and the other a projection which fits into said recess and is completely enclosed thereby where the two meet to prevent the insertion of prying means between them.

3. In a tire carrier, the combination of means for supporting a demountable rim, a member removably mounted on said supporting means and having a portion which projects outward at the edge of such rim, said removable member being provided with a pocket, a removable locking member for closing said pocket, means located in said pocket and accessible only when said locking means is removed for locking said removable member to said carrying means, said removable member being provided with a flange which projects over the edge of the cooperating part of said supporting means and completely encloses the same to prevent the insertion of prying means therebetween.

4. In a tire carrier, the combination of a supporting carrier having a plurality of arms, some of said arms being provided with two notches for receiving demountable rims, and another of such arms being provided with a removable member which when in place provides one notch for a demountable rim, a projecting arm from said last-named arm, a swinging member which is mounted on said projecting arm and may be swung into and out of rim-holding position, a locking member cooperating with said swinging member to provide a notch for receiving a second demountable rim, a second swinging member for holding said first swinging member in rim-holding position, said second swinging member being movable to permit the first swinging member to be swung out of rim-holding position, and means for fastening said locking member in place on said first swinging member, said second locking member being provded with an openable lock box in which said fastening means is located.

5. In a tire carrier, the combination of a supporting carrier having a plurality of arms, some of said arms being provided with two notches for receiving demountable rims, and another of such arms being provided with a removable member which when in place provides one notch for a demountable rim, a projecting arm from said last-named arm, a swinging member which is mounted on said projecting arm and may be swung into and out of rim-holding position, a locking member cooperating with said swinging member to provide a notch for receiving a second demountable rim, a second swinging member for holding said first swinging member in rim-holding position, said second swinging member being movable to permit the first swinging member to be swung out of rim-holding position, and means for fastening said locking member in place on said first swinging member, said second locking member being provided with an openable lock box in which said fastening means is located, said two locking members being interchangeable.

6. In a tire carrier, the combination of a supporting carrier having a plurality of arms, some of said arms being provided with two notches for receiving demountable rims, and another of such arms being provided with a removable member which when in place provides one notch for a demountable rim, a projecting arm from said last-named arm, a swinging member which is mounted on said projecting arm and may be swung into and out of rim-holding position, a locking member cooperating with said swinging member to provide a notch for receiving a second demountable rim, a second swinging member for holding said first swinging member in rim-holding position, said second swinging member being movable to permit the first swinging member to be swung out of rim-holding position, means for fastening said locking member in place on said first swinging member, said second locking member being provided with an openable lock box in which said fastening means is located, said second locking member when in place locking said second swinging arm in the position where it holds said first swinging member in rim-holding position.

7. In a tire carrier, the combination of a supporting carrier having a plurality of arms, some of said arms being provided with two notches for receiving demountable rims, and another of such arms being provided with a removable member which when in place provides one notch for a demountable rim, a projecting arm from said last-named arm, a swinging member which is mounted on said projecting arm and may be swung into and out of rim-holding position, a locking member cooperating with said swinging member to provide a notch for receiving a second demountable rim, a second swinging member for holding said first swinging member in rim-holding position, said second swinging member being movable to permit the first swinging member to be swung out of rim-holding position, and means for fastening said locking member in place on said first swinging member, said second locking member being provided with an openable lock box in which said fastening means is located, said two locking members being interchangeable, either of said locking members when in place on said first swinging member cooperating with said second swinging member to hold the latter in position where it holds the first swinging member in rim-holding position.

8. In a tire carrier, the combination of a supporting carrier having a plurality of arms, some of said arms being provided with two notches for receiving demountable rims, and another of such arms being provided with a removable member which when in place provides one notch for a demountable rim, a projecting arm from said last-named arm, a swinging member which is mounted on said projecting arm and may be swung into and out of rim-holding position, a locking member cooperating with said swinging member to provide a notch for receiving a second demountable rim, a second swinging member for holding said first swinging member in rim-holding position, said second swinging member being movable to permit the first swinging member to be swung out of rim-holding position, and means for fastening said locking member in place on said first swinging member.

9. In a tire carrier, the combination of a supporting carrier having a plurality of arms, some of said arms being provided with two notches for receiving demountable rims, and another of such arms being provided with a removable member which when in place provides one notch for a demountable rim, a projecting arm from said last-named arm, a swinging member which is mounted on said projecting arm and may be swung into and out of rim-holding position, a locking member cooperating with said swinging member to provide a notch for receiving a second demountable rim, a second swinging member for holding said first swinging member in rim-holding position, said second swinging member being movable to permit the first swinging member to be swung out of rim-holding position, and means including a lock for locking said locking member in place on said first swinging member.

10. In a tire carrier, the combination of a supporting carrier having a plurality of arms, some of said arms being provided with two notches for receiving demountable rims, and another of such arms being provided with a removable member which when in place provides one notch for a demountable rim, a projecting arm from said last-named arm, a swinging member which is mounted on said projecting arm and may be swung into and out of rim-holding position, a locking member cooperating with said swinging member to provide a notch for receiving a second demountable rim, a second swinging member for holding said first swinging member in rim-holding position, said second swinging member being movable to permit the first swinging member to be swung out of rim holding position, and means including a lock for locking said locking member in place on said first swinging member, said two locking members being interchangeable.

11. In a tire carrier, the combination of a supporting carrier having a plurality of arms, some of said arms being provided with two notches for receiving demountable rims, and another of such arms being provided with a removable member which when in place provides one notch for a demountable rim, a projecting arm from said last-named arm, a swinging member which is mounted on said projecting arm and may be swung into and out of rim-holding position, a locking member cooperating with said swinging member to provide a notch for receiving a second demountable rim, a second swinging member for holding said first swinging member in rim-holding position, said second swinging member being movable to permit the first swinging member to be swung out of rim-holding position, and means including a lock for locking said locking member in place on said first swinging member, said second locking member when in place locking said second swinging arm in the position where it holds said first swinging member in rim-holding position.

12. In a double tire carrier, the combination of a supporting carrier having a plurality of arms each of which is provided with two notches for receiving the respective tires, each of the notches in one of said arms being formed by two relatively separable parts having outwardly projecting fingers which form a notch between them, means for clamping together the two parts forming each notch on such arm, one of the pairs of notch-forming members being on a swinging member swingable relatively to the remainder of the arm, and means for holding said swinging member in a fixed position.

13. In a double tire carrier, the combination of a supporting carrier having a plurality of arms each of which is provided with two notches for receiving the respective tires, each of the notches in one of said arms being formed by two relatively separable parts, having outwardly projecting fingers which form a notch between them, means for clamping together the two parts forming each notch on such arm, one of the pairs of notch-forming members being on a swinging member swingable relatively to the remainder of the arm, and means for holding said swinging member in a fixed position, and a second swinging arm mounted on a separate pivot from said first swinging member and cooperating with the first swinging member to hold the latter in a fixed position.

14. In a double tire carrier, the combination of a supporting carrier having a plurality of arms each of which is provided with two notches for receiving the respective tires, each of the notches in one of said arms being formed by two relatively separable parts having outwardly projecting fingers which form a notch between them, means for clamping together the two parts forming each notch on such arm, one of the pairs of notch-forming members being on a swinging member swingable relatively to the remainder of the arm, means for holding said swinging member in a fixed position, and a second swinging arm mounted on a separate pivot from said first swinging member and co-operating with the first swinging member to hold the latter in a fixed position, said second swinging arm being arranged to co-operate with the removable notch-forming member on said first swinging member to be locked in locking position by said removable notch-forming member when the latter is locked in place.

15. In a tire carrier, the combination of carrying means for holding a demountable rim, a relatively movable member associated with said carrying means and having an outwardly projecting finger, and means for locking said movable member in a fixed position on said carrying means, one of the two parts connected by said locking means being provided with a lockable inclosure which must be opened to provide access to said locking means, and said movable member and said carrying means being arranged to meet on a joint wherein a projection from one of said parts projects into a recess in the other and is completely enclosed thereby.

16. In a tire carrier, the combination of carrying means for holding a demountable rim, a relatively movable member associated with said carrying means and having an outwardly projecting finger, and means for locking said movable member in a fixed position on said carrying means, one of the two parts connected by said locking means being provided with a lockable inclosure which must be opened to provide access to said locking means, and said movable member and said carrying means being arranged to meet on a joint wherein a projection from one of said parts projects into a recess in the other near the outer edges of their meeting faces and be completely enclosed thereby so that it is possible to insert a prying implement inward from the edge of such meeting faces at such joint only a short distance.

In witness whereof, I have hereunto set my hand at Indianapolis, Indiana, this 1st day of December, A. D. one thousand nine hundred and twenty one.

HARRY A. WEAVER.